US012803437B2

(12) United States Patent
Zafarana

(10) Patent No.: US 12,803,437 B2
(45) Date of Patent: Nov. 17, 2026

(54) CROSS CAPACITORS FOR MULTISTAGE POWER CONVERTERS

(71) Applicant: SEMICONDUCTOR COMPONENTS INDUSTRIES, LLC, Scottsdale, AZ (US)

(72) Inventor: Alessandro Zafarana, Milan (IT)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 248 days.

(21) Appl. No.: 18/391,981

(22) Filed: Dec. 21, 2023

(65) Prior Publication Data

US 2025/0211102 A1 Jun. 26, 2025

Related U.S. Application Data

(60) Provisional application No. 63/494,393, filed on Apr. 5, 2023.

(51) Int. Cl.
*H02M 3/158* (2006.01)
*H02M 1/00* (2007.01)
(Continued)

(52) U.S. Cl.
CPC ......... *H02M 3/158* (2013.01); *H02M 1/0095* (2021.05); *H02M 3/07* (2013.01); *H02M 1/38* (2013.01)

(58) Field of Classification Search
CPC ........ H02M 3/07; H02M 3/01; H02M 3/1586; H02M 1/36; H02M 1/0095;
(Continued)

(56) References Cited

U.S. PATENT DOCUMENTS 10,547,241 B1 * 1/2020 Li ........................ H02M 3/1588
11,626,796 B2 4/2023 Zafarana
(Continued)

OTHER PUBLICATIONS

Liang, Jiawei, et al., "Overview of Voltage Regulator Modules in 48 V Bus-Based Data Center Power Systems", CPSS Transactions on Power Electronics and Applications, vol. 7, No. 3, Sep. 2022, 17 pages.

*Primary Examiner* — Fred E Finch, III
*Assistant Examiner* — Ularislao Cordova
(74) *Attorney, Agent, or Firm* — Dickinson Wright PLLC

(57) ABSTRACT

Systems for power conversion, multistage power converters, and methods for operating multistage power converters. The system includes a multistage power converter and a controller. The multistage power converter includes a first stage circuit and a second stage circuit. The first stage circuit includes a first pair of field-effect transistors (FETs), a first output inductor, and a first capacitor coupled between the first pair of FETs. The second stage circuit includes a second pair of FETs, a second output inductor, and a second capacitor coupled between the second pair of FETs. During a first on-time, the controller is configured to turn on the first stage circuit and to couple the first capacitor's cathode terminal to the second capacitor's anode terminal. During a second on-time, the controller is configured to turn on the second stage circuit and to couple the second capacitor's cathode terminal to the first capacitor's anode terminal.

15 Claims, 7 Drawing Sheets

(51) Int. Cl.
*H02M 1/38* (2007.01)
*H02M 3/07* (2006.01)

(58) Field of Classification Search
CPC ....... H02M 3/155–1588; H02M 3/156; H02M 3/158; H02M 3/1582; H02M 3/1557
See application file for complete search history.

(56) References Cited

U.S. PATENT DOCUMENTS

2022/0231618 A1* 7/2022 Yan ......................... H02M 3/07
2023/0134427 A1* 5/2023 Liu ......................... H02M 3/07 323/271

* cited by examiner

CROSS CAPACITORS FOR MULTISTAGE POWER CONVERTERS

CROSS-REFERENCE TO RELATED APPLICATION

This application claims the benefit of Provisional Application No. 63/494,393 filed Apr. 5, 2023 titled "HIGH-EFFICIENCY POWER CONVERSION WITH CROSS-CAP CONVERTER." The provisional application is incorporated by reference herein as if reproduced in full below.

BACKGROUND

Data centers, particularly data centers having mixed telecommunication equipment and servers, are transitioning toward distributing power within the racks in the 40 Volts to 60 Volts range (for example, 48 Volts), while most servers are specified to receive as a supply voltage a tightly regulated 12 Volts. As the transition continues, there is a need for power converters to convert the distributed power at 40 Volts to 60 Volts to the tightly regulated 12 Volts with high efficiency (for example, 98% or greater) and be easily scalable.

SUMMARY

Multistage variants of the buck converter topology are widely used for high-power applications. When a multistage buck converter for a high-power load device is provided with a low input voltage, large currents flow through the multistage buck converter and cause unwanted power dissipation by producing excessive heat. The unwanted power dissipation can be reduced by increasing the input voltage. Thus, the present disclosure provides systems for power conversion, multistage power converters, and methods for operating multistage power converters that, among other things, use cross capacitors to divide the voltage input.

For example, the present disclosure provides a system for power conversion, including, in one implementation, a multistage power converter and a controller. The multistage power converter includes a first stage circuit and a second stage circuit. The first stage circuit includes a first pair of field-effect transistors (FETs), a first output inductor, and a first capacitor. The first capacitor is coupled between the first pair of FETs. The second stage circuit includes a second pair of FETs, a second output inductor, and a second capacitor. The second capacitor is coupled between the second pair of FETS. The controller is configured to turn on the first stage circuit during a first on-time to charge the first output inductor. The controller is also configured to couple a cathode terminal of the first capacitor to an anode terminal of the second capacitor during the first on-time. The controller is further configured to turn on the second stage circuit during a second on-time to charge the second output inductor. The controller is also configured to couple a cathode terminal of the second capacitor to an anode terminal of the first capacitor during the second on-time.

The present disclosure also provides a multistage power converter including, in one implementation, a first stage circuit and a second stage circuit. The first stage circuit includes a first capacitor, a first high-side FET, a first low-side FET, a first crossing FET, and a first output inductor. The first high-side FET is coupled between a voltage input and an anode terminal of the first capacitor. The first low-side FET is coupled between a cathode terminal of the first capacitor and a reference terminal. The first output inductor is coupled between to the cathode terminal of the first capacitor and a voltage output. The second stage circuit includes a second capacitor, a second high-side FET, a second low-side FET, a second crossing FET, and a second output inductor. The second high-side FET is coupled between the voltage input and an anode terminal of the second capacitor. The second low-side FET is coupled between a cathode terminal of the second capacitor and the reference terminal. The second crossing FET is coupled between the cathode terminal of the second capacitor and the anode terminal of the first capacitor. The second output inductor is coupled between to the cathode terminal of the second capacitor and the voltage output. The first crossing FET is coupled between the cathode terminal of the first capacitor and the anode terminal of the second capacitor.

The present disclosure also provides a method for operating a multistage power converter. The method includes turning on a first stage circuit of the multistage power converter during a first on-time to charge a first output inductor of the multistage power converter. The method also includes coupling a cathode terminal of a first capacitor to an anode terminal of a second capacitor during the first on-time to divide a voltage input of the multistage power converter. The first capacitor is coupled between a first pair of FETs of the first stage circuit. The method further includes turning on a second stage circuit of the multistage power converter during a second on-time to charge a second output inductor of the multistage power converter. The method also includes coupling a cathode terminal of the second capacitor to an anode terminal of the first capacitor during the second on-time to divide the voltage input. The second capacitor is coupled between a second pair of FETs of the second stage circuit.

The present disclosure also provides a system for power conversion including, in one implementation, a multistage power converter and a controller. The multistage power converter includes a first stage circuit, a second stage circuit, a capacitive voltage divider, and a second order output filter. The capacitive voltage divider is configured to generate a reduced voltage that is about half of a voltage input of the multistage power converter. The second order output filter is configured to use the reduced voltage to generate a voltage output of the multistage power converter. The controller is configured to generate driving signals that operate the first stage circuit and the second stage circuit with an interleaving phase shift.

BRIEF DESCRIPTION OF THE DRAWINGS

For a detailed description of example implementations, reference will now be made to the accompanying drawings in which.

DEFINITIONS

Figure 1:
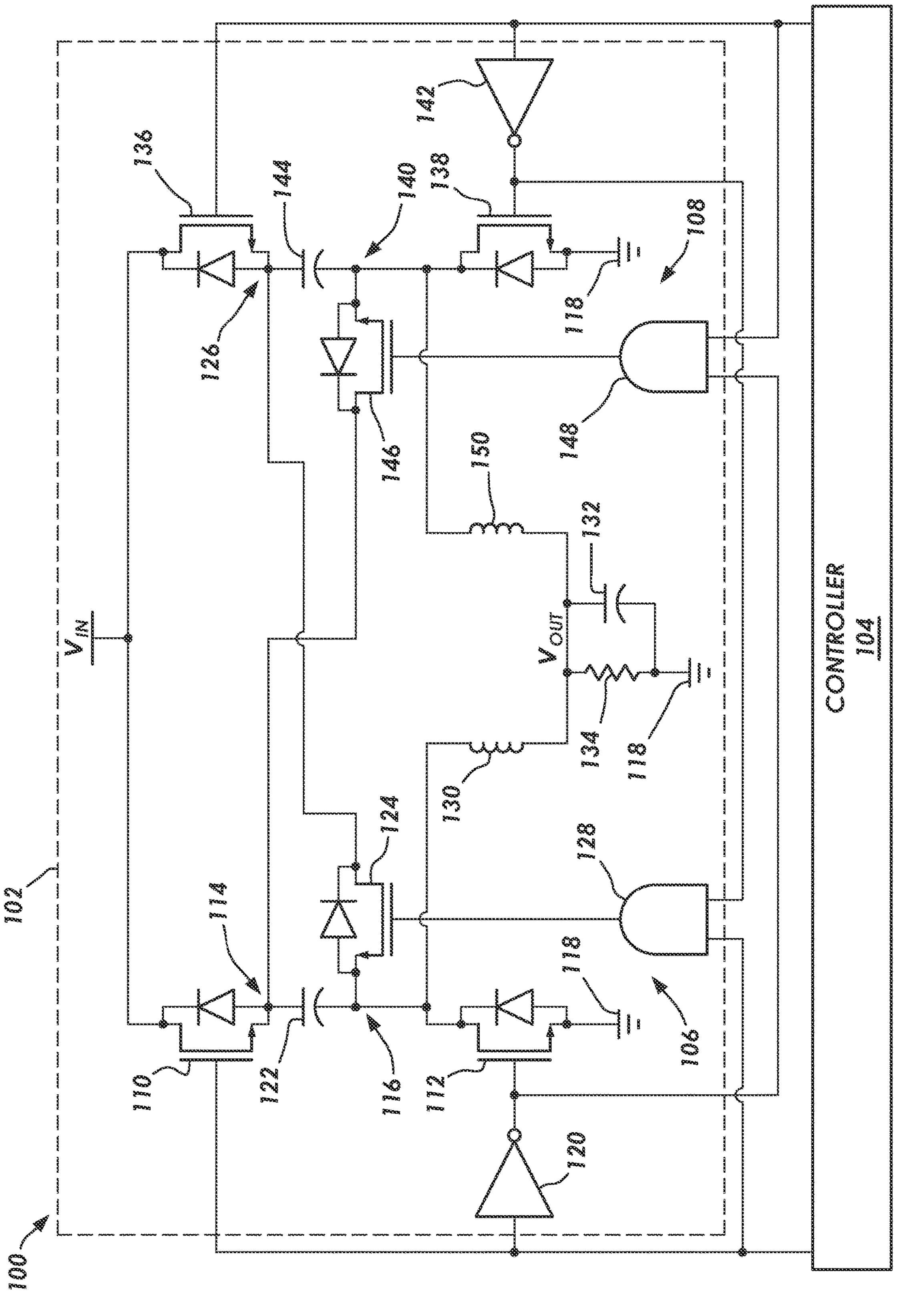
FIG. 1 is a partial schematic and a partial block diagram of an example of a multistage power converter in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. To be clear, an initial reference to "a [referent]", and then a later reference for antecedent basis purposes to "the [referent]", shall not obviate the fact the recited referent may be plural.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Assert" shall mean creating or maintaining a first predetermined state of a Boolean signal. Boolean signals may be asserted high or with a higher voltage, and Boolean signals may be asserted low or with a lower voltage, at the discretion of the circuit designer. Similarly, "de-assert" shall mean creating or maintaining a second predetermined state of the Boolean, opposite the asserted state.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to multistage power converters having cross capacitors. In particular, example multistage power converters may use the cross capacitors to reduce current flow through electrically-controlled switches of stage circuits. More particularly still, example multistage power converters may couple the cross capacitors to form capacitive voltage dividers that divide the input voltage. The specification first turns to an example system to orient the reader.

FIG. 1 is a partial schematic and a partial block diagram of an example of a system 100 for power conversion in accordance with some implementations. The system 100 illustrated in FIG. 1 includes a multistage power converter 102 and a controller 104. In some implementations, the multistage power converter 102 and the controller 104 are separate components. In alternate implementations, the multistage power converter 102 and the controller 104 may be part of the same component. For example, the multistage power converter 102 and the controller 104 may both be positioned on a single printed circuit board, within a single chip housing, or within a multi-chip module or housing.

The multistage power converter 102 includes a voltage input $V_{IN}$ and a voltage output $V_{OUT}$. In example cases, the voltage input $V_{IN}$ is in the range of about 40 Volts to about 60 Volts, and nominally about 48 Volts. For the given voltage input $V_{IN}$, in many cases the voltage output $V_{OUT}$ may be about 12 Volts, but the voltage output $V_{OUT}$ may be selected at the discretion of the circuit designer. The multistage power converter 102 further includes a left-side stage circuit 106 and a right-side stage circuit 108. The designations left-side and right-side are arbitrary and shall not be read to require any particular physical layout.

The left-side stage circuit 106 (one example of a "first stage circuit") includes a series of electrically-controlled switches. The electrically-controlled switches are illustratively shown in FIG. 1 as field-effect transistors (FETs). Hereafter, the electrically-controlled switches are referred to as FETs with the understanding that any suitable electrically controlled switch may be used (for example, metal-oxide-semiconductor field-effect transistors (MOSFETs), junction transistors, or FETs of any suitable variety). In particular, the left-side stage circuit 106 includes an upper left-side FET 110 and a lower left-side FET 112, which collectively provide an example of a "first pair of FETs." The upper left-side FET 110 (one example of a "first high-side FET") includes a drain terminal, a source terminal, and a gate terminal. The drain terminal of the upper left-side FET 110 is coupled to the voltage input $V_{IN}$. The source terminal of the upper left-side FET 110 defines a left-side charge node 114. The gate terminal of the upper left-side FET 110 is coupled to the controller 104. The lower left-side FET 112 (one example of a "first low-side FET") includes a drain terminal, a source terminal, and a gate terminal. The drain terminal of the lower left-side FET 112 defines a left-side switch node 116. The source terminal of the lower left-side FET 112 is coupled to a reference terminal 118 that provides a reference voltage $V_{REF}$ (for example, ground or common). The gate terminal of the lower left-side FET 112 is coupled to the controller 104 by way of a first logic NOT gate 120. The left-side stage circuit 106 further includes a left-side pump capacitor 122. The left-side pump capacitor 122 (one example of a "first capacitor") has an anode terminal coupled to the left-side charge node 114 and a cathode terminal coupled to the left-side switch node 116. The left-side stage circuit 106 also includes a left-side crossing FET 124. The left-side crossing FET 124 (one example of a "first crossing FET") includes a drain terminal, a source terminal, and a gate terminal. The drain terminal of the left-side crossing FET 124 is coupled to a right-side charge node 126 defined by the right-side stage circuit 108, as will be described in more detail below. The source terminal of the left-side crossing FET 124 is coupled to the left-side switch node 116. The gate terminal of the left-side crossing FET 124 is coupled to the controller 104 by way of a first logic AND gate 128. The left-side stage circuit 106 further includes a left-side output inductor 130. The left-side output inductor 130 (one example of a "first output inductor") has a first lead coupled to the left-side switch node 116 and a second lead defining the voltage output $V_{OUT}$. The voltage output $V_{OUT}$ is coupled to an output capacitor 132 and a load resistor 134. The left-side output inductor 130 and the output capacitor 132 together form a second order output filter.

The right-side stage circuit 108 (one example of a "second stage circuit") includes a series of electrically-controlled switches, again illustratively shown in FIG. 1 as FETs. In particular, the right-side stage circuit 108 includes an upper right-side FET 136 and a lower right-side FET 138, which collectively provide an example of a "second pair of FETs." The upper right-side FET 136 (one example of a "second high-side FET") includes a drain terminal, a source terminal, and a gate terminal. The drain terminal of the upper right-side FET 136 is coupled to the voltage input $V_{IN}$. The source terminal of the upper right-side FET 136 defines the right-side charge node 126. The gate terminal of the upper right-side FET 136 is coupled to the controller 104. The lower right-side FET 138 (one example of a "second low-side FET") includes a drain terminal, a source terminal, and a gate terminal. The drain terminal of the lower right-side FET 138 defines a right-side switch node 140. The source terminal of the lower right-side FET 138 is coupled to the reference terminal 118. The gate terminal of the lower right-side FET 138 is coupled to the controller 104 by way of a second logic NOT gate 142. The right-side stage circuit 108 further includes a right-side pump capacitor 144. The right-side pump capacitor 144 (one example of a "second capacitor") has an anode terminal coupled to the right-side charge node 126 and a cathode terminal coupled to the right-side switch node 140. As will be described in more detail below, the capacitance of the right-side pump capacitor 144 is substantially equal to the capacitance of the left-side pump capacitor 122 in order to reduce the voltage input $V_{IN}$ by about one-half. For example, the left-side pump capacitor 122 and the right-side pump capacitor 144 may both have capacitances of 20 microfarads. The right-side stage circuit 108 also includes a right-side crossing FET 146. The right-side crossing FET 146 (one example of a "second crossing FET") includes a drain terminal, a source terminal, and a gate terminal. The drain terminal of the right-side crossing FET 146 is coupled to the left-side charge node 114. The source terminal of the right-side crossing FET 146 is coupled to the right-side switch node 140. The gate terminal of the right-side crossing FET 146 is coupled to the controller 104 by way of a second logic AND gate 148. The right-side stage circuit 108 further includes a right-side output inductor 150. The right-side output inductor 150 (one example of a "second output inductor") has a first lead coupled to the right-side switch node 140 and a second lead also defining the voltage output $V_{OUT}$. The right-side output inductor 150 and the output capacitor 132 together form a second order output filter.

In some implementations, the first logic NOT gate 120, the first logic AND gate 128, the second logic NOT gate 142, and the second logic AND gate 148 are included in the multistage power converter 102 as illustrated in FIG. 1. In alternate implementations, the first logic NOT gate 120, the first logic AND gate 128, the second logic NOT gate 142, the second logic AND gate 148, or some combination thereof may be included in the controller 104 instead of in the multistage power converter 102.

The specification now turns to a step-by-step explanation of operation of the multistage power converter 102. In the following figures, the FET will be shown as a short circuit when a FET is conductive, and the FET will be shown as an open circuit (or just the FET's body diode) when a FET is non-conductive. Moreover, in the following, the controller 104 is omitted so as not to further complicate the figures; however, it will be understood that the controller 104 controls the overall process by asserting the gates of the example FETs at the appropriate times. The explanation assumes the multistage power converter 102 to have been operational for a period of time such that startup operation considerations are not a concern.

In operation, each stage circuit has an on-time within which the stage circuit charges its respective output inductor. For example, during an on-time of the left-side stage circuit 106 (hereafter referred to as the "left on-time"), the left-side output inductor 130 is charged. The left-side output inductor 130 provides current to the voltage output $V_{OUT}$ during the left on-time and at least a portion of the time between left on-times. Similarly, during an on-time of the right-side stage circuit 108 (hereafter referred to as the "right on-time"), the right-side output inductor 150 is charged. Thus, the right-side output inductor 150 provides current to the voltage output $V_{OUT}$ during the right on-time and at least a portion of the time between right on-times. The on-times of the left-side stage circuit 106 begin at a switching frequency, and similarly the on-times of the right-side stage circuit 108 begin at the switching frequency. However, the controller 104 is configured to generate driving signals that operate the left-side stage circuit 106 and the right-side stage circuit 108 with an interleaving phase shift. Thus, the left-side stage circuit 106 and the right-side stage circuit 108 operate at a different phase relationship. In particular, while operating at the same switching frequency, in some implementations, the on-times of the left-side stage circuit 106 and the right-side stage circuit 108 are separated by a 180° degree phase relationship.

Figure 2:
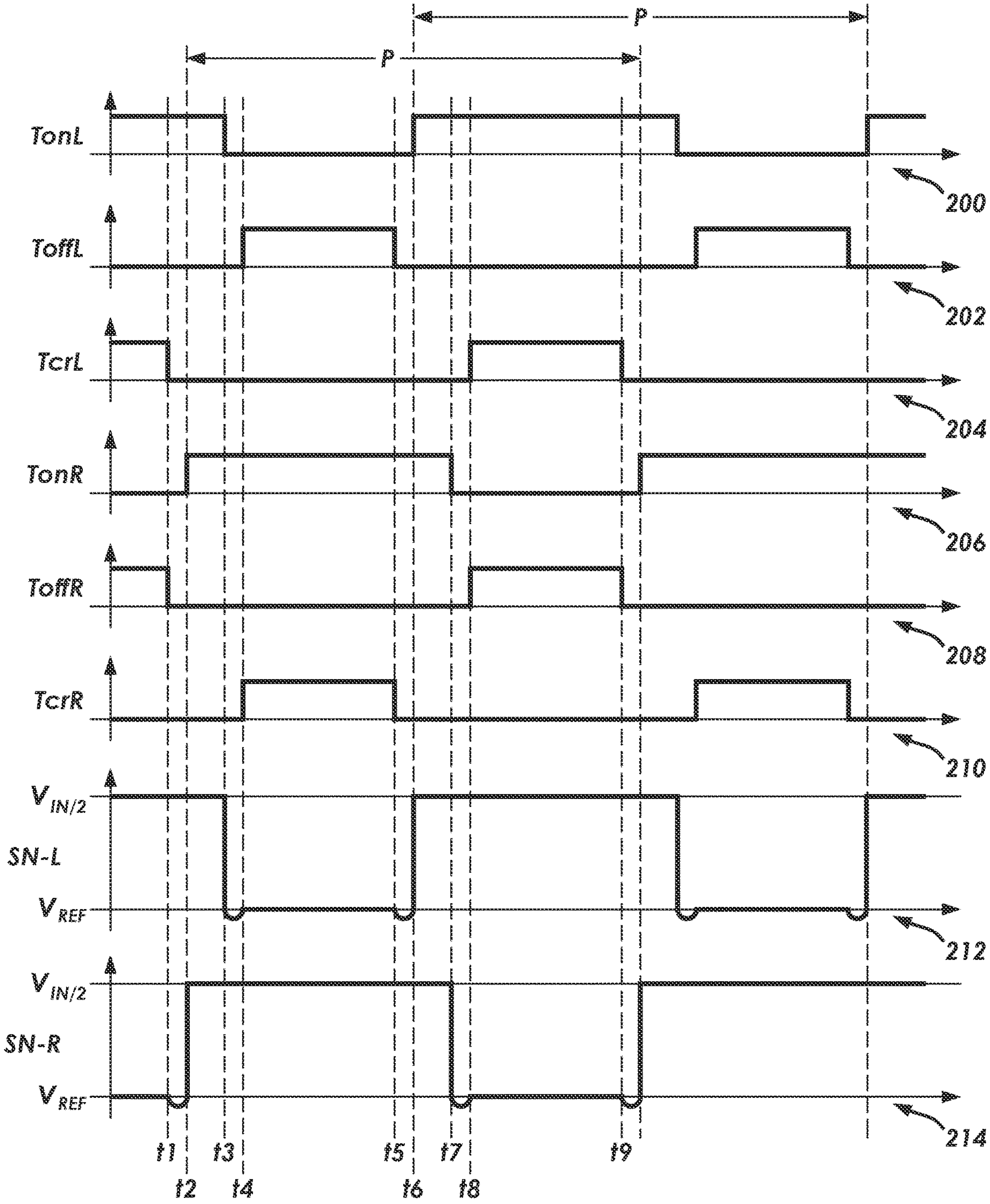
FIG. 2 is an example of a timing diagram for a multistage power converter in accordance with some implementations.

FIG. 2 shows an example of a timing diagram. In particular, plot 200 shows an example of a left on-time signal (TonL) applied to the gate terminal of the upper left-side FET 110, plot 202 shows an example of a left off-time signal (ToffL) applied to the gate terminal of the lower left-side FET 112, plot 204 shows an example of a left crossing signal (TcrL) applied to the gate terminal of the left-side crossing FET 124, plot 206 shows an example of a right on-time signal (TonR) applied to the gate terminal of the upper right-side FET 136, plot 208 shows an example of a right off-time signal (ToffR) applied to the gate terminal of the lower right-side FET 138, and plot 210 shows an example of a right crossing signal (TorR) applied to the gate terminal of the right-side crossing FET 146. Each of the signals in plots 200, 202, 204, 206, 208, and 210 are Boolean signals, and are illustratively shown as asserted high. However, the asserted state of the signals may take any suitable form (for example, asserted low) at the discretion of the circuit designer and based on the type of electrically-controlled switches implemented.

The on-times described above occur at a switching frequency having a switching period. For example, the left on-time occurs at the switching frequency being the inverse of a switching period P shown between any two corresponding features of the example left on-time TonL signal (for example, rising edges as shown in FIG. 2). Similarly, the right on-time occurs at the switching frequency being the inverse of a switching period P between any two corresponding features of the example right on-time TonR signal (for example, rising edges as shown in FIG. 2). FIG. 2 also shows that while the on-times occur at the same switching frequency, the on-times occur at a different phase relationship (for example, 180° degrees).

Still referring to FIG. 2, the timing diagram also includes plot 212 which shows an example waveform of the voltage at the left-side switch node 116 (SN-L). The timing diagram of FIG. 2 further includes plot 214 which shows an example waveform of the voltage at the right-side switch node 140 (SN-R). As illustrated in plots 212 and 214 of FIG. 2, the voltages applied at the left-side switch node 116 and the right-side switch node 140 alternate between about half of the voltage input $V_{IN}$ and the reference voltage $V_{REF}$. As described in more detail below, the multistage power converter 102 is configured and operated so that the voltages applied at the left-side switch node 116 and the right-side switch node 140 alternate between about half of the voltage input $V_{IN}$ and the reference voltage $V_{REF}$. In other words, the multistage power converter 102 is configured and operated to divide the voltage input $V_{IN}$ in half. Because the multistage power converter 102 divides the voltage input $V_{IN}$ in half, the multistage power converter 102 produces the same voltage output $V_{OUT}$ as a conventional buck converter from double the voltage input $V_{IN}$ while using the same duty-cycle. Doubling the voltage input $V_{IN}$ reduces the current in half. As power distribution network (PDN) losses are the square of the current ($P=I^2R$), doubling the voltage input $V_{IN}$ reduces PDN losses by four times. Thus, by dividing the voltage input $V_{IN}$ in half, the multistage power converter 102 reduces PDN losses by four times.

Figure 3:
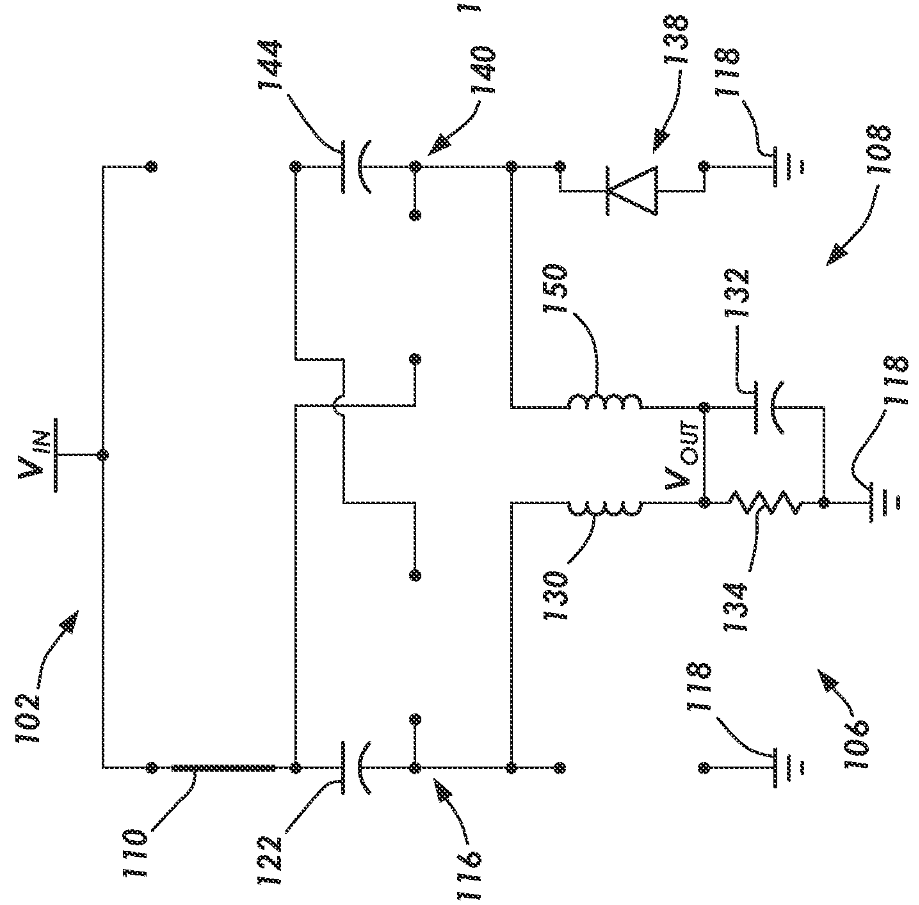
FIG. 3 is a schematic of an example of a multistage power converter during a dead time before the start of an on-time of a right-side stage circuit in accordance with some implementations.

At the start of the right on-time, the right off-time signal ToffR goes de-asserted and the right on-time signal TonR goes asserted. As alluded to in reference to FIG. 1 by way of the second logic NOT gate 142, the right off-time signal ToffR is the inverse (or logical NOT) of the right on-time signal TonR. In particular, the right off-time signal ToffR is asserted at times when the right on-time signal TonR is de-asserted, and vice versa. In order to avoid shoot through, example systems may implement a dead time (for example, about 40 nanoseconds) between assertions of the TonR and ToffR signals. For example, in the timing diagram of FIG. 2, the right off-time signal ToffR goes de-asserted at time t1, and after a dead time (for example, a first dead time between time t1 and time t2) the right on-time signal TonR goes asserted at time t2. FIG. 3 is a schematic of the multistage power converter 102 during the first dead time between time t1 and time t2. During the first dead time, the upper left-side FET 110 is conductive, and the lower left-side FET 112, the left-side crossing FET 124, the upper right-side FET 136, the lower right-side FET 138, and the right-side crossing FET 146 are non-conductive, as illustrated in FIG. 3. While in this configuration, the left-side pump capacitor 122 is coupled to the voltage input $V_{IN}$ via the upper left-side FET 110. The left-side pump capacitor 122 is configured to store about half of the voltage input $V_{IN}$. Thus, a voltage of about half of the voltage input $V_{IN}$ (an example of a "reduced voltage") is applied at the left-side switch node 116. For example, in plot 212 of the timing diagram of FIG. 2, the voltage at the left-side switch node 116 (SN-L) is equal to about half of the voltage input $V_{IN}$ during the first dead time between time t1 and time t2. Further, while in this configuration, reverse current flows through the body diode of the lower right-side FET 138. The voltage at the right-side switch node 140 may drop to about one diode forward voltage drop below the reference voltage $V_{REF}$ (for example, about −0.7 Volts). For example, in plot 214 of the timing diagram of FIG. 2, the voltage at the right-side switch node 140 (SN-R) drops slightly below the reference voltage $V_{REF}$ during the first dead time between time t1 and time t2.

Figure 4:
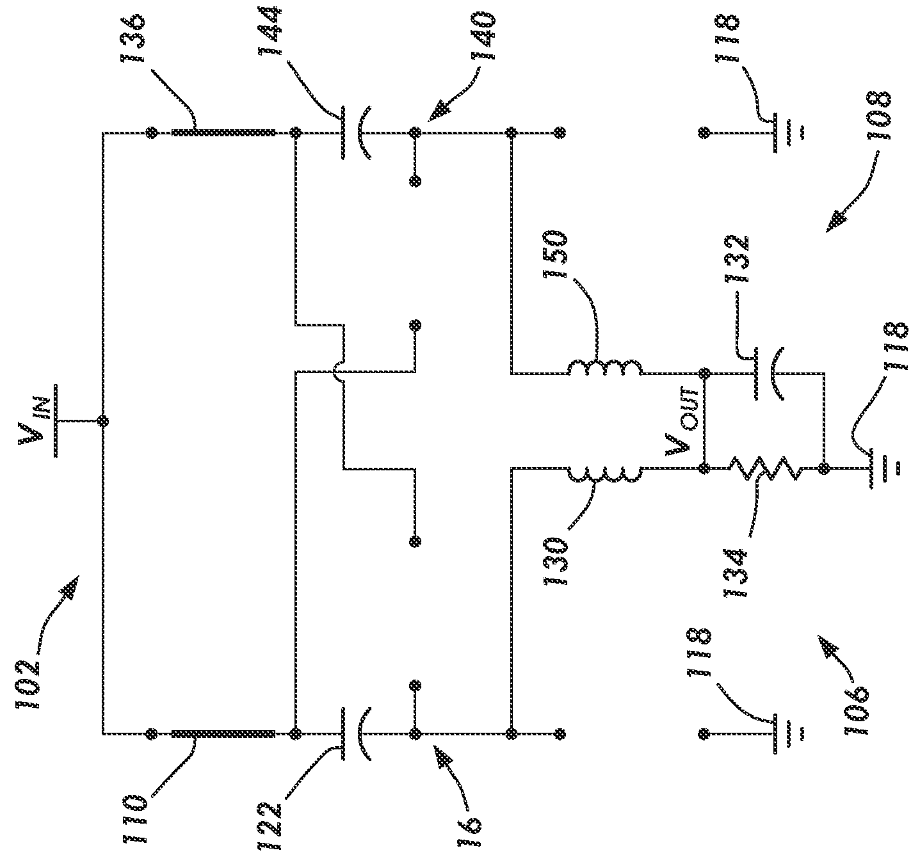
FIG. 4 is a schematic of an example of a multistage power converter during an overlap time between the start of an on-time of a right-side stage circuit and the end of an on-time of a left-side stage circuit in accordance with some implementations.

Example systems may implement an overlap time between the start of the right on-time and the end of the left on-time. In other words, the controller 104 may turn on the right-side stage circuit 108 before turning off the left-side stage circuit 106. For example, in the timing diagram of FIG. 2, the right on-time signal TonR goes asserted at time t2, and after an overlap time (for example, a first overlap time between time t2 and time t3) the left on-time signal TonL goes de-asserted at time t3. FIG. 4 is a schematic of the multistage power converter 102 during the first overlap time between time t2 and time t3. During the first overlap time, the upper left-side FET 110 and the upper right-side FET 136 are conductive, and the lower left-side FET 112, the left-side crossing FET 124, the lower right-side FET 138, and the right-side crossing FET 146 are non-conductive, as illustrated in FIG. 4. While in this configuration, the left-side pump capacitor 122 is coupled to the voltage input $V_{IN}$ via the upper left-side FET 110. Thus, a voltage of about half of the voltage input $V_{IN}$ (an example of a "reduced voltage") is applied at the left-side switch node 116. For example, in plot 212 of the timing diagram of FIG. 2, the voltage at the left-side switch node 116 (SN-L) is equal to about half of the voltage input $V_{IN}$ during the first overlap time between time t2 and time t3. Further, while in this configuration, the right-side pump capacitor 144 is coupled to the voltage input $V_{IN}$ via the upper right-side FET 136. The right-side pump capacitor 144 is configured to store about half of the voltage input $V_{IN}$. Thus, a voltage of about half of the voltage input $V_{IN}$ is applied at the right-side switch node 140. For example, in plot 214 of the timing diagram of FIG. 2, the voltage at the right-side switch node 140 (SN-R) rises to about half of the voltage input $V_{IN}$ at the start of the first overlap time between time t2 and time t3.

Figure 5:
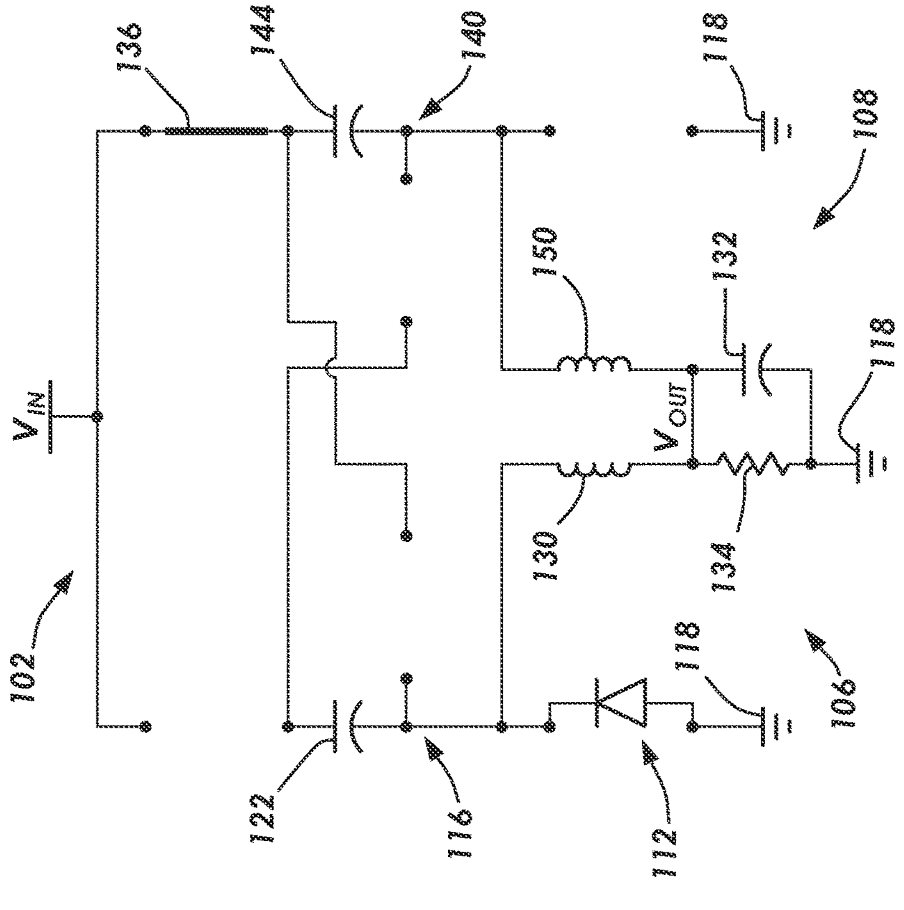
FIG. 5 is a schematic of an example of a multistage power converter during a dead time after the end of an on-time of a left-side stage circuit in accordance with some implementations.

At the end of the left on-time, the left on-time signal TonL goes de-asserted and the left off-time signal ToffL goes asserted. As alluded to in reference to FIG. 1 by way of the first logic NOT gate 120, the left off-time signal ToffL is the inverse (or logical NOT) of the left on-time signal TonL. In particular, the left off-time signal ToffL is asserted at times when the left on-time signal TonL is de-asserted, and vice versa. Again, to avoid shoot through, example systems may implement a dead time (for example, about 40 nanoseconds) between assertions of the TonL and ToffL signals. For example, in the timing diagram of FIG. 2, the left on-time signal TonL goes de-asserted at time t3, and after a dead time (for example, a second dead time between time t3 and time t4) the left off-time signal ToffL signal goes asserted at time t4. FIG. 5 is a schematic of the multistage power converter 102 during the second dead time between time t3 and time t4. During the second dead time, the upper right-side FET 136 is conductive, and the upper left-side FET 110, the lower left-side FET 112, the left-side crossing FET 124, the lower right-side FET 138, and the right-side crossing FET 146 are non-conductive, as illustrated in FIG. 5. While in this configuration, reverse current flows through the body diode of the lower left-side FET 112. The voltage at the left-side switch node 116 may drop to about one diode forward voltage drop below the reference voltage $V_{REF}$. For example, in plot 212 of the timing diagram of FIG. 2, the voltage at the left-side switch node 116 (SN-L) drops slightly below the reference voltage $V_{REF}$ during the second dead time between time t3 and time t4. Further, while in this configuration, the right-side pump capacitor 144 is coupled to the voltage input $V_{IN}$ via the upper right-side FET 136. Thus, a voltage of about half of the voltage input $V_{IN}$ is applied at the right-side switch node 140. For example, in plot 214 of the timing diagram of FIG. 2, the voltage at the right-side switch node 140 (SN-R) is equal to about half of the voltage input $V_{IN}$ during the second dead time between time t3 and time t4.

Figure 6:
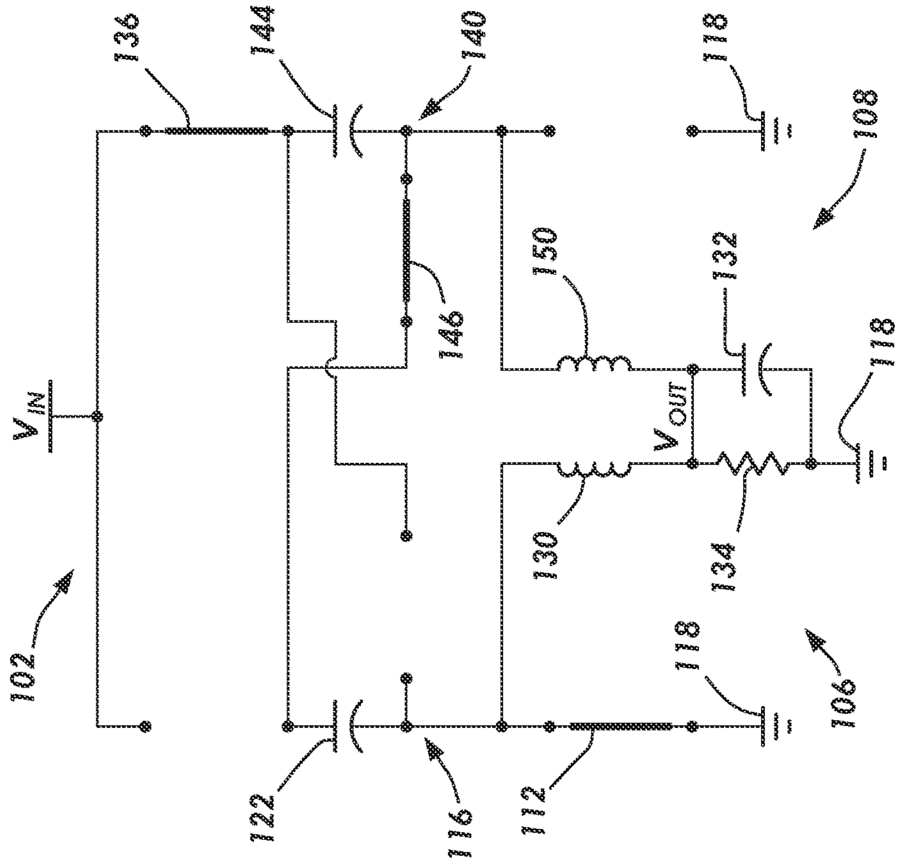
FIG. 6 is a schematic of an example of a multistage power converter during a crossing time of a right-side stage circuit in accordance with some implementations

As alluded to in reference to FIG. 1 by way of the second logic AND gate 148, the right crossing signal TorR is the combination (or logical AND) of the right on-time signal TonR and the left off-time signal ToffL. In particular, the right crossing signal TorR is asserted at times when the right on-time signal TonR and the left off-time signal ToffL are both asserted. For example, in plot 210 of the timing diagram of FIG. 2, the right crossing signal TorR goes asserted when the left off-time signal ToffL goes asserted at time t4 when the right on-time signal TonR is already asserted, and after a crossing time (for example, a first crossing time between time t4 and time t5) the right crossing signal TorR goes de-asserted when the left off-time signal ToffL goes de-asserted at time t5. FIG. 6 is a schematic of the multistage power converter 102 during the first crossing time between time t4 and time t5. During the first crossing time, the lower left-side FET 112, the upper right-side FET 136, and the right-side crossing FET 146 are conductive, and the upper left-side FET 110, the left-side crossing FET 124, and the lower right-side FET 138 are non-conductive, as illustrated in FIG. 6. While in this configuration, the lower left-side FET 112 provides a low-impedance connection between the left-side switch node 116 and the reference terminal 118. Thus, the reference voltage $V_{REF}$ is applied at the left-side switch node 116. For example, in plot 212 of the timing diagram of FIG. 2, the voltage at the left-side switch node 116 (SN-L) is equal to the reference voltage $V_{REF}$ during the first crossing time between time t4 and time t5. Further, while in this configuration, the right-side pump capacitor 144 in coupled in series with the left-side pump capacitor 122 via the right-side crossing FET 146. Coupling the right-side pump capacitor 144 is series with the left-side pump capacitor 122 via the right-side crossing FET 146 forms a capacitive voltage divider at the right-side switch node 140. In particular, the voltage applied by the capacitive voltage divider at the right-side switch node 140 may be given by the following equation:

$$V_{SN-R} = V_{IN}\left(C_2/(C_1 + C_2)\right) \tag{1)}$$

where $V_{SN-R}$ is the voltage at the right-side switch node 140, $C_1$ is the capacitance of the left-side pump capacitor 122, and $C_2$ is the capacitance of the right-side pump capacitor 144. Given that the capacitance of the right-side pump capacitor 144 is substantially equal to the capacitance of the left-side pump capacitor 122, Equation 1) can be re-written as $V_{SN-R}=V_{IN}/2$. In other words, the capacitive voltage divider applies a voltage at the right-side switch node 140 that is about half of the voltage input $V_{IN}$. For example, in plot 214 of the timing diagram of FIG. 2, the voltage at the right-side switch node 140 (SN-R) is equal to about half of the voltage input $V_{IN}$ during the first crossing time between time t4 and time t5.

Figure 7:
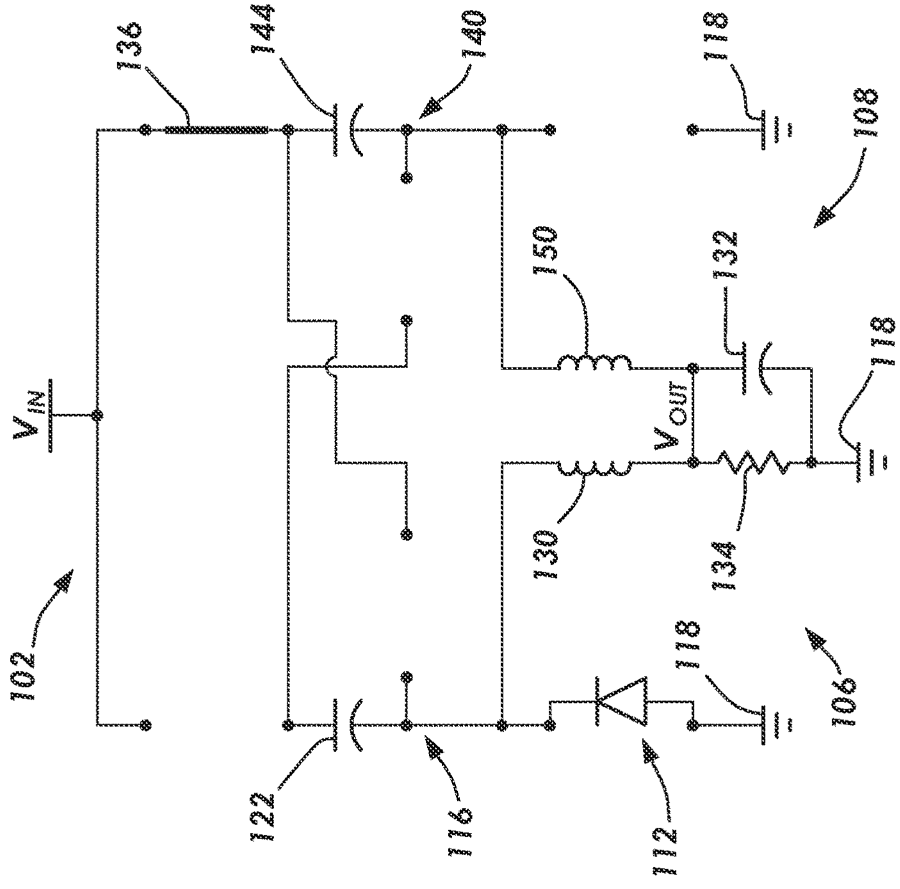
FIG. 7 is a schematic of an example of a multistage power converter during a dead time before the start of an on-time of a left-side stage circuit in accordance with some implementations.

At the start of the left on-time, the left off-time signal ToffL goes de-asserted and the left on-time signal TonL goes asserted. Again to avoid shoot through, example systems may implement a dead time between assertions of the TonL and ToffL signals. For example, in the timing diagram of FIG. 2, the left off-time signal ToffL goes de-asserted at time t5, and after a dead time (for example, a third dead time between time t5 and time t6) the left on-time signal TonL goes asserted at time t6. FIG. 7 is a schematic of the multistage power converter 102 during the third dead time between time t5 and time t6. During the third dead time, the upper right-side FET 136 is conductive, and the upper left-side FET 110, the lower left-side FET 112, the left-side crossing FET 124, the lower right-side FET 138, and the right-side crossing FET 146 are non-conductive, as illustrated in FIG. 7. While in this configuration, reverse current flows through the body diode of the lower left-side FET 112. The voltage at the left-side switch node 116 may drop to about one diode forward voltage drop below the reference voltage $V_{REF}$. For example, in plot 212 of the timing diagram of FIG. 2, the voltage at the left-side switch node 116 (SN-L) drops slightly below the reference voltage $V_{REF}$ during the third dead time between time t5 and time t6. Further, while in this configuration, the right-side pump capacitor 144 is coupled to the voltage input $V_{IN}$ via the upper right-side FET 136. Thus, a voltage of about half of the voltage input $V_{IN}$ is applied at the right-side switch node 140. For example, in plot 214 of the timing diagram of FIG. 2, the voltage at the right-side switch node 140 (SN-R) is equal to about half of the voltage input $V_{IN}$ during the third dead time between time t5 and time t6.

Figure 8:
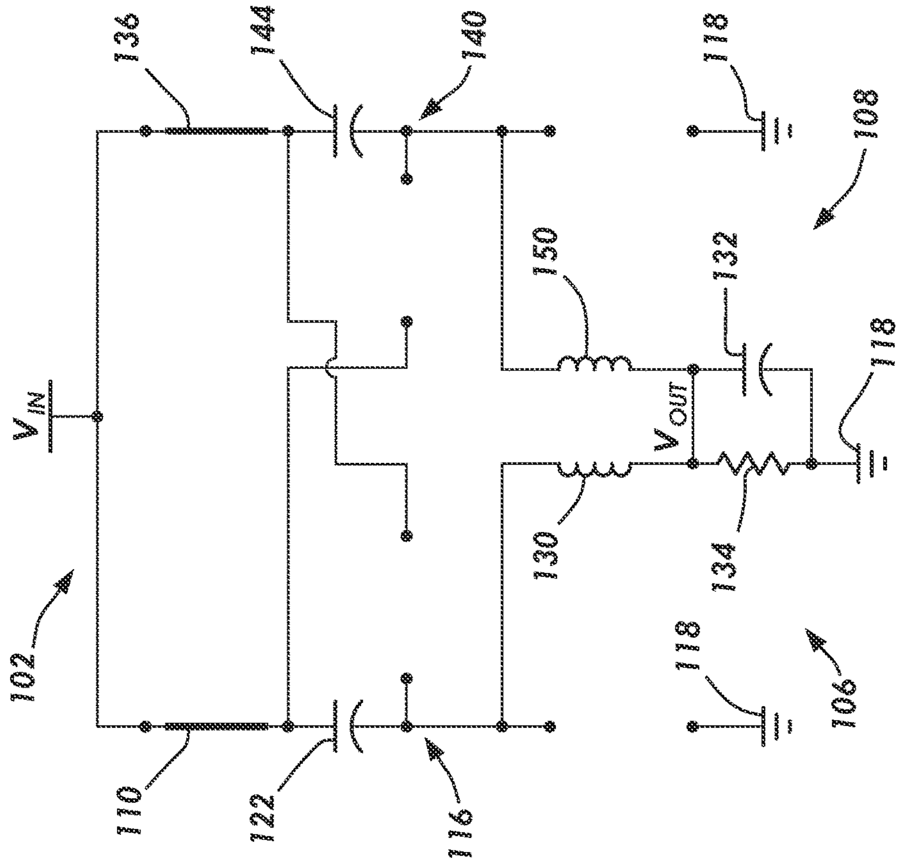
FIG. 8 is a schematic of an example of a multistage power converter during an overlap time between the start of an on-time of a left-side stage circuit and the end of an on-time of a right-side stage circuit in accordance with some implementations.

Example systems may implement an overlap time between the start of the left on-time and the end of the right on-time. In other words, the controller 104 may turn on the left-side stage circuit 106 before turning off the right-side stage circuit 108. For example, in the timing diagram of FIG. 2, the left on-time signal TonL goes asserted at time t6 and after an overlap time (for example, a second overlap time between time t6 and time t7) the right on-time signal TonR goes de-asserted at time t7. FIG. 8 is a schematic of the multistage power converter 102 during the second overlap time between time t6 and time t7. During the second overlap time, the upper left-side FET 110 and the upper right-side FET 136 are conductive, and the lower left-side FET 112, the left-side crossing FET 124, the lower right-side FET 138, and the right-side crossing FET 146 are non-conductive, as illustrated in FIG. 8. While in this configuration, the left-side pump capacitor 122 is coupled to the voltage input $V_{IN}$ via the upper left-side FET 110. Thus, a voltage of about half of the voltage input $V_{IN}$ is applied at the left-side switch node 116. For example, in plot 212 of the timing diagram of FIG. 2, the voltage at the left-side switch node 116 (SN-L) rises to about half of the voltage input $V_{IN}$ at the start of the second overlap time between time t6 and time t7. Further, while in this configuration, the right-side pump capacitor 144 is coupled to the voltage input $V_{IN}$ via the upper right-side FET 136. Thus, a voltage of about half of the voltage input $V_{IN}$ is applied at the right-side switch node 140. For example, in plot 214 of the timing diagram of FIG. 2, the voltage at the right-side switch node 140 (SN-R) is equal to about half of the voltage input $V_{IN}$ during the second overlap time between time t6 and time t7.

Figure 9:
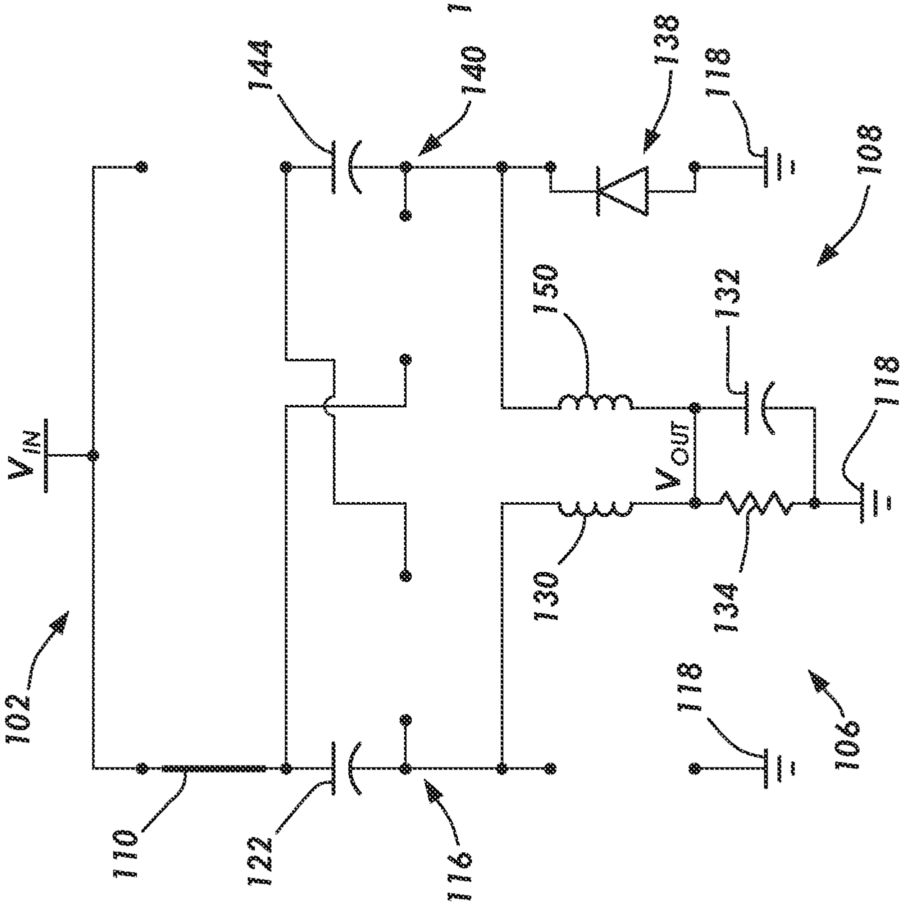
FIG. 9 is a schematic of an example of a multistage power converter during a dead time after the end of an on-time of a right-side stage circuit in accordance with some implementations.

At the end of the right on-time, the right on-time signal TonR goes de-asserted and the right off-time signal ToffR goes asserted. Again to avoid shoot through, example systems may implement a dead time (for example, about 40 nanoseconds) between assertions of the TonR and ToffR signals. For example, in the timing diagram of FIG. 2, the right off-time signal ToffR goes de-asserted at time t7, and after a dead time (for example, a fourth dead time between time t7 and time t8) the right on-time signal TonR goes asserted at time t8. FIG. 9 is a schematic of the multistage power converter 102 during the fourth dead time between time t7 and time t8. During the fourth dead time, the upper left-side FET 110 is conductive, and the lower left-side FET 112, the left-side crossing FET 124, the upper right-side FET 136, the lower right-side FET 138, and the right-side crossing FET 146 are non-conductive, as illustrated in FIG. 9. While in this configuration, the left-side pump capacitor 122 is coupled to the voltage input $V_{IN}$ via the upper left-side FET 110. Thus, a voltage of about half of the voltage input $V_{IN}$ is applied at the left-side switch node 116. For example, in plot 212 of the timing diagram of FIG. 2, the voltage at the left-side switch node 116 (SN-L) is equal to about half of the voltage input $V_{IN}$ during the fourth dead time between time t7 and time t8. Further, while in this configuration, reverse current flows through the body diode of the lower right-side FET 138. The voltage at the right-side switch node 140 may drop to about one diode forward voltage drop below the reference voltage $V_{REF}$. For example, in plot 214 of the timing diagram of FIG. 2, the voltage at the right-side switch node 140 (SN-R) drops slightly below the reference voltage $V_{REF}$ during the fourth dead time between time t7 and time t8.

Figure 10:
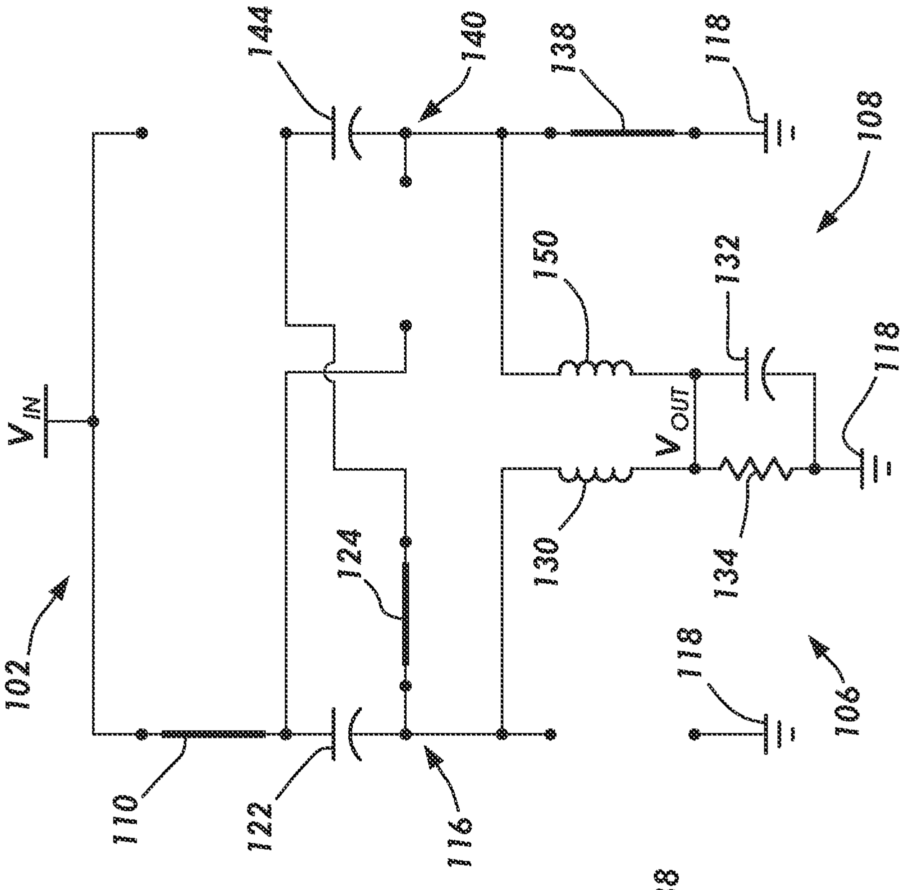
FIG. 10 is a schematic of an example of a multistage power converter during a crossing time of a left-side stage circuit in accordance with some implementations.

As alluded to in reference to FIG. 1 by way of the first logic AND gate 128, the left crossing signal TcrL is the combination (or logical AND) of the left on-time signal TonL and the right off-time signal ToffR. In particular, the left crossing signal TcrL is asserted at times when the left on-time signal TonL and the right off-time signal ToffR are both asserted. For example, in plot 204 of the timing diagram of FIG. 2, the left crossing signal TcrL goes asserted when the right off-time signal ToffR goes asserted at time t8 while the left on-time signal TonL is already asserted, and after a crossing time (for example, a second crossing time between time t8 and time t9) the left crossing signal TcrL goes de-asserted when the right off-time signal ToffR goes de-asserted at time t9. FIG. 10 is a schematic of the multistage power converter 102 during the second crossing time between time t8 and time t9. During the second crossing time, the upper left-side FET 110, the left-side crossing FET 124, and the lower right-side FET 138 are conductive, and the lower left-side FET 112, the upper right-side FET 136, and the right-side crossing FET 146 are non-conductive, as illustrated in FIG. 10. While in this configuration, the left-side pump capacitor 122 in coupled in series with the right-side pump capacitor 144 via the left-side crossing FET 124. Coupling the left-side pump capacitor 122 is series with the right-side pump capacitor 144 via the left-side crossing FET 124 forms a capacitive voltage divider at the left-side switch node 116. In particular, the voltage applied by the capacitive voltage divider at the left-side switch node 116 may be given by the following equation:

$$V_{SN-L} = V_{IN}(C_1/(C_1 + C_2)) \qquad 2)$$

where $V_{SN-L}$ is the voltage at the left-side switch node 116, $C_1$ is the capacitance of the left-side pump capacitor 122, and $C_2$ is the capacitance of the right-side pump capacitor 144. Given that the capacitance of the left-side pump capacitor 122 is substantially equal to the capacitance of the right-side pump capacitor 144, Equation 2) can be re-written as $V_{SN-L}=V_{IN}/2$. In other words, the capacitive voltage divider applies a voltage at the left-side switch node 116 that is equal to about half of the voltage input $V_{IN}$. For example, in plot 214 of the timing diagram of FIG. 2, the voltage at the left-side switch node 116 (SN-L) is equal to about half of the voltage input $V_{IN}$ during the second crossing time between time t8 and time t9. Further, while in this configuration, the lower right-side FET 138 provides a low-impedance connection between the right-side switch node 140 and the reference terminal 118. Thus, the reference voltage $V_{REF}$ is applied at the right-side switch node 140. For example, in plot 214 of the timing diagram of FIG. 2, the voltage at the right-side switch node 140 (SN-R) is equal to the reference voltage $V_{REF}$ during the second crossing time between time t8 and time t9.

The plurality of FETs included in the multistage power converter 102 are connected to prevent energy loss in the left-side pump capacitor 122 and the right-side pump capacitor 144. For example, the plurality of FETs are connected to prevent energy loss caused by reverse current flowing through a body diode of a FET. Returning to the implementation illustrated in FIG. 1, the body diodes of the left-side crossing FET 124 and the lower right-side FET 138 are coupled in opposite directions across the right-side pump capacitor 144 to block current flow out of the right-side pump capacitor 144 when the plurality of FETs are turned off. Further, in the implementation illustrated in FIG. 1, the body diodes of the right-side crossing FET 146 and the lower left-side FET 112 are coupled in opposite directions across the left-side pump capacitor 122 to block current flow out of the left-side pump capacitor 122 when the plurality of FETs are turned off. Thus, due to their connectivity, the plurality of FETs included in the left-side stage circuit 106, the right-side stage circuit 108, and the capacitive voltage divider are configured to block current flow through the plurality of FETs when the plurality of FETs are turned off.

Figure 11:
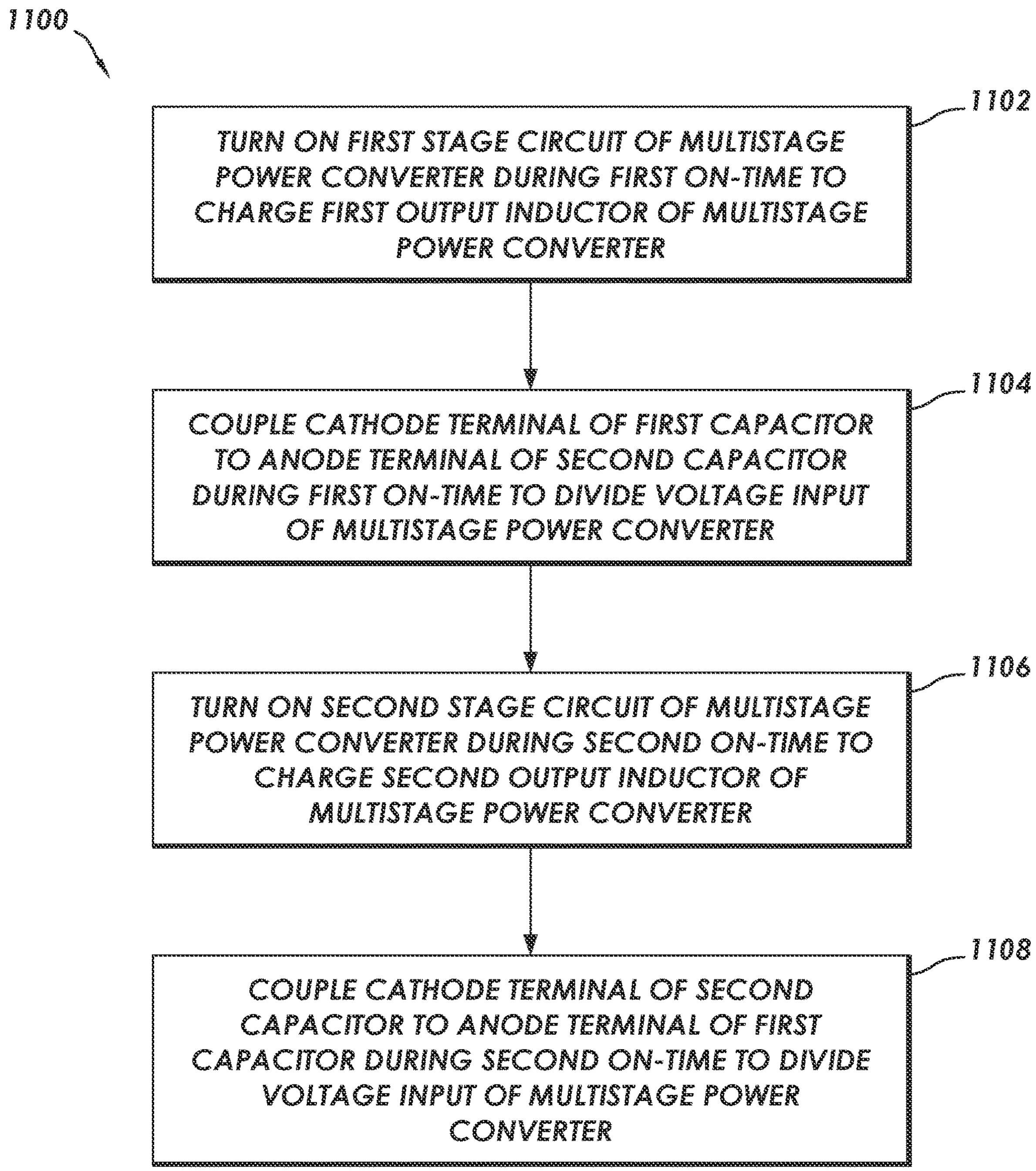
FIG. 11 is a flow diagram of an example of a method for operating a multistage power converter in accordance with some implementations.

FIG. 11 is a flow diagram of an example of a method 1100 for operating the multistage power converter 102 in accordance with some implementations. For simplicity of explanation, the method 1100 is depicted in FIG. 11 and described as a series of operations. However, the operations can occur in various orders and/or concurrently, and/or with other operations not presented and described herein.

At block 1102, a first stage circuit of the multistage power converter 102 is turned on during a first on-time to charge a first output inductor of the multistage power converter 102. For example, the left-side stage circuit 106 may be turned on during a left on-time to charge the left-side output inductor 130. In some implementations, the left-side stage circuit 106 is turned on when the lower left-side FET 112 is turned off and the upper left-side FET 110 is turned on. For example, the controller 104 may de-assert the left off-time signal ToffL to turn off the lower left-side FET 112 and assert the left on-time signal TonL to turn on the upper left-side FET 110. In some implementations, the start of the left on-time overlaps with the end of the right on-time. For example, the left-side stage circuit 106 may be turned on before the right-side stage circuit 108 is turned off.

At block 1104, a cathode terminal of a first capacitor is coupled to an anode terminal of a second capacitor during the first on-time to divide the voltage input $V_{IN}$ of the multistage power converter 102. For example, the cathode terminal of the left-side pump capacitor 122 may be coupled to the anode terminal of the right-side pump capacitor 144 during a left on-time to form a capacitive voltage divider that divides the voltage input $V_{IN}$. In some implementations, the cathode terminal of the left-side pump capacitor 122 is coupled to the anode terminal of the right-side pump capacitor 144 by turning on the left-side crossing FET 124. For example, the controller 104 may assert the left crossing signal TcrL to turn on the left-side crossing FET 124.

At block 1106, a second stage circuit of the multistage power converter 102 is turned on during a second on-time to charge a second output inductor of the multistage power converter 102. For example, the right-side stage circuit 108 may be turned on during a right on-time to charge the right-side output inductor 150. In some implementations, the right-side stage circuit 108 is turned on when the lower right-side FET 138 is turned off and the upper right-side FET 136 is turned on. For example, the controller 104 may de-assert the right off-time signal ToffR to turn off the lower right-side FET 138 and assert the right on-time signal TonR to turn on the upper right-side FET 136. In some implementations, the start of the right on-time overlaps with the end of the left on-time. For example, the right-side stage circuit 108 may be turned on before the left-side stage circuit 106 is turned off.

At block 1108, a cathode terminal of the second capacitor is coupled to an anode terminal of the first capacitor during the second on-time to divide the voltage input $V_{IN}$ of the multistage power converter 102. For example, the cathode terminal of the right-side pump capacitor 144 may be coupled to the anode terminal of the left-side pump capacitor 122 during a right on-time to form a capacitive voltage divider that divides the voltage input $V_{IN}$. In some implementations, the cathode terminal of the right-side pump capacitor 144 is coupled to the anode terminal of the left-side pump capacitor 122 by turning on the right-side crossing FET 146. For example, the controller 104 may assert the right crossing signal TorR to turn on the right-side crossing FET 146.

In steady state operation, the left on-time is equal to or about equal to the right on-time, and further in steady state operation the on-times are constant or about constant. During the design phase, the on-time is selected based on the designed voltage output $V_{OUT}$. In particular, the duty cycle of the multistage power converter 102 may be given by the following equation:

$$D = V_{OUT}/(V_{IN}/2) \qquad 3)$$

where D is the duty cycle. Given an expected voltage input $V_{IN}$, and a selected voltage output $V_{OUT}$, the duty cycle is thus provided by Equation 3). With a duty cycle D determined, on-time is equal to the switching period P (FIG. 2) multiplied by the duty cycle D.

Consistent with the above disclosure, the examples of systems and methods enumerated in the following clauses are specifically contemplated and are intended as a non-limiting set of examples.

Clause 1. A system for power conversion, comprising:
- a multistage power converter including:
  - a first stage circuit including a first pair of field-effect transistors (FETs), a first output inductor, and a first capacitor coupled between the first pair of FETs, and
  - a second stage circuit including a second pair of FETs, a second output inductor, and a second capacitor coupled between the second pair of FETs; and
- a controller configured to:
  - turn on the first stage circuit during a first on-time to charge the first output inductor,
  - couple a cathode terminal of the first capacitor to an anode terminal of the second capacitor during the first on-time,
  - turn on the second stage circuit during a second on-time to charge the second output inductor, and
  - couple a cathode terminal of the second capacitor to an anode terminal of the first capacitor during the second on-time.

Clause 2. The system of any clause herein, wherein a capacitance of the first capacitor is substantially equal to a capacitance of the second capacitor.

Clause 3. The system of any clause herein, wherein the first stage circuit further includes a first crossing FET coupled between the cathode terminal of the first capacitor and the anode terminal of the second capacitor, wherein, to couple the cathode terminal of the first capacitor to the anode terminal of the second capacitor during the first on-time, the controller is further configured to turn on the first crossing FET during the first on-time, wherein the second stage circuit further includes a second crossing FET coupled between the cathode terminal of the second capacitor and the anode terminal of the first capacitor, and wherein, to couple the cathode terminal of the second capacitor to the anode terminal of the first capacitor during the second on-time, the controller is further configured to turn on the second crossing FET during the second on-time.

Clause 4. The system of any clause herein, wherein the controller is further configured to:
- turn on the second stage circuit before turning off the first stage circuit, and then
- turn on the first stage circuit before turning off the second stage circuit.

Clause 5. The system of any clause herein, wherein the controller is further configured to:
- operate the first stage circuit at a switching frequency, the first on-time, and a first phase, and
- operate the second stage circuit at the switching frequency, the second on-time, and a second phase different than the first phase.

Clause 6. The system of any clause herein, wherein the first on-time is substantially equal to second on-time.

Clause 7. The system of any clause herein, wherein the first pair of FETs includes:

a first high-side FET coupled between a voltage input and the anode terminal of the first capacitor, and a first low-side FET coupled between the cathode terminal of the first capacitor and a reference terminal, and wherein the second pair of FETs includes:

a second high-side FET coupled between the voltage input and the anode terminal of the second capacitor, and a second low-side FET coupled between the cathode terminal of the second capacitor and the reference terminal.

Clause 8. The system of any clause herein, wherein the first output inductor is coupled between to the cathode terminal of the first capacitor and a voltage output, and wherein the second output inductor is coupled between to the cathode terminal of the second capacitor the voltage output.

Clause 9. The system of any clause herein, wherein the voltage input is between 40 Volts and 60 Volts, and wherein the voltage output is about 12 Volts.

Clause 10. A multistage power converter comprising:

a first stage circuit including:

a first capacitor, a first high-side field-effect transistor (FET) coupled between a voltage input and an anode terminal of the first capacitor, a first low-side FET coupled between a cathode terminal of the first capacitor and a reference terminal, a first crossing FET, and a first output inductor coupled between to the cathode terminal of the first capacitor and a voltage output; and a second stage circuit including:

a second capacitor, a second high-side FET coupled between the voltage input and an anode terminal of the second capacitor, a second low-side FET coupled between a cathode terminal of the second capacitor and the reference terminal, a second crossing FET coupled between the cathode terminal of the second capacitor and the anode terminal of the first capacitor, and a second output inductor coupled between to the cathode terminal of the second capacitor and the voltage output, wherein the first crossing FET is coupled between the cathode terminal of the first capacitor and the anode terminal of the second capacitor.

Clause 11. The multistage power converter of any clause herein, wherein a drain terminal of the first crossing FET is coupled to the anode terminal of the second capacitor, and wherein a drain terminal of the second crossing FET is coupled to the anode terminal of the first capacitor.

Clause 12. The multistage power converter of any clause herein, wherein a drain terminal of the first high-side FET is coupled to the voltage input, wherein a drain terminal of the first low-side FET is coupled to the cathode terminal of the first capacitor, wherein a drain terminal of the second high-side FET is coupled to the voltage input, and wherein a drain terminal of the second low-side FET is coupled to the cathode terminal of the second capacitor.

Clause 13. The multistage power converter of any clause herein, wherein the first crossing FET is configured to turn on when the first high-side FET and the second low-side FET are both turned on, and wherein the second crossing FET is configured to turn on when the second high-side FET and the first low-side FET are both turned on.

Clause 14. The multistage power converter of any clause herein, wherein a capacitance of the first capacitor is substantially equal to a capacitance of the second capacitor.

Clause 15. A method for operating a multistage power converter, comprising:

turning on a first stage circuit of the multistage power converter during a first on-time to charge a first output inductor of the multistage power converter;

coupling a cathode terminal of a first capacitor to an anode terminal of a second capacitor during the first on-time to divide a voltage input of the multistage power converter, wherein the first capacitor is coupled between a first pair of field-effect transistors (FETs) of the first stage circuit;

turning on a second stage circuit of the multistage power converter during a second on-time to charge a second output inductor of the multistage power converter; and coupling a cathode terminal of the second capacitor to an anode terminal of the first capacitor during the second on-time to divide the voltage input, wherein the second capacitor is coupled between a second pair of FETs of the second stage circuit.

Clause 16. The method of any clause herein, further comprising:

turning on the first stage circuit before turning off the second stage circuit; and then turning on the second stage circuit and before turning off the first stage circuit.

Clause 17. The method of any clause herein, further comprising:

operating the first stage circuit at a switching frequency, the first on-time, and a first phase; and operating the second stage circuit at the switching frequency, the second on-time, and a second phase different than the first phase.

Clause 18. A system for power conversion, comprising:

a multistage power converter including:

a first stage circuit, a second stage circuit, a capacitive voltage divider configured to generate a reduced voltage that is about half of a voltage input of the multistage power converter, and a second order output filter configured to use the reduced voltage to generate a voltage output of the multistage power converter; and a controller configured to generate driving signals that operate the first stage circuit and the second stage circuit with an interleaving phase shift.

Clause 19. The system of any clause herein, wherein the second order output filter includes:

a first output inductor coupled between the first stage circuit and the voltage output, a second output inductor coupled between the second stage circuit and the voltage output, and an output capacitor coupled between the voltage output and a reference terminal.

Clause 20. The system of any clause herein, wherein the first stage circuit, the second stage circuit, and the capacitive voltage divider further include a plurality of field-effect transistors (FETs) configured to block current flow through the plurality of FETs when the plurality of FETs are turned off.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A system for power conversion, comprising:
a multistage power converter including:
a first stage circuit including a first pair of field-effect transistors (FETs), a first output inductor, a first capacitor coupled between the first pair of FETs, and a first crossing FET, and
a second stage circuit including a second pair of FETs, a second output inductor, a second capacitor coupled between the second pair of FETs, and a second crossing FET, wherein a drain terminal of the second crossing FET is directly coupled to a cathode terminal of the second capacitor, and wherein a source terminal of the second crossing FET is directly coupled to an anode terminal of the first capacitor; and
a controller configured to:
turn on the first stage circuit during a first on-time to charge the first output inductor,
turn on the first crossing FET during the first on-time,
turn on the second stage circuit during a second on-time to charge the second output inductor, and
turn on the second crossing FET during the second on-time,
wherein a drain terminal of the first crossing FET is directly coupled to the cathode terminal of the first capacitor, and wherein a source terminal of first crossing FET is directly coupled to the anode terminal of the second capacitor.

2. The system of claim 1, wherein a capacitance of the first capacitor is substantially equal to a capacitance of the second capacitor.

3. The system of claim 1, wherein the controller is further configured to:
turn on the second stage circuit before turning off the first stage circuit, and then
turn on the first stage circuit before turning off the second stage circuit.

4. The system of claim 1, wherein the controller is further configured to:
operate the first stage circuit at a switching frequency, the first on-time, and a first phase, and
operate the second stage circuit at the switching frequency, the second on-time, and a second phase different than the first phase.

5. The system of claim 1, wherein the first on-time is substantially equal to second on-time.

6. The system of claim 1, wherein the first pair of FETs includes:
a first high-side FET coupled between a voltage input and the anode terminal of the first capacitor, and
a first low-side FET coupled between the cathode terminal of the first capacitor and a reference terminal, and
wherein the second pair of FETs includes:
a second high-side FET coupled between the voltage input and the anode terminal of the second capacitor, and
a second low-side FET coupled between the cathode terminal of the second capacitor and the reference terminal.

7. The system of claim 6, wherein the first output inductor is coupled between the cathode terminal of the first capacitor and a voltage output, and wherein the second output inductor is coupled between the cathode terminal of the second capacitor the voltage output.

8. The system of claim 7, wherein the voltage input is between 40 Volts and 60 Volts, and wherein the voltage output is about 12 Volts.

9. A multistage power converter comprising:
a first stage circuit including:
a first capacitor,
a first high-side field-effect transistor (FET) coupled between a voltage input and an anode terminal of the first capacitor,
a first low-side FET coupled between a cathode terminal of the first capacitor and a reference terminal,
a first crossing FET, and
a first output inductor coupled between the cathode terminal of the first capacitor and a voltage output; and
a second stage circuit including:
a second capacitor,
a second high-side FET coupled between the voltage input and an anode terminal of the second capacitor,
a second low-side FET coupled between a cathode terminal of the second capacitor and the reference terminal,
a second crossing FET:
including a drain terminal directly coupled to the cathode terminal of the second capacitor and a source terminal directly coupled to the anode terminal of the first capacitor, and
configured to turn on when the second high-side FET and the first low-side FET are both turned on, and
a second output inductor coupled between the cathode terminal of the second capacitor and the voltage output,
wherein the first crossing FET:
including a drain terminal directly coupled to the cathode terminal of the first capacitor and a source terminal directly coupled to the anode terminal of the second capacitor, and
configured to turn on when the first high-side FET and the second low-side FET are both turned on.

10. The multistage power converter of claim 9, wherein a drain terminal of the first crossing FET is coupled to the anode terminal of the second capacitor, and wherein a drain terminal of the second crossing FET is coupled to the anode terminal of the first capacitor.

11. The multistage power converter of claim 10, wherein a drain terminal of the first high-side FET is coupled to the voltage input, wherein a drain terminal of the first low-side FET is coupled to the cathode terminal of the first capacitor, wherein a drain terminal of the second high-side FET is coupled to the voltage input, and wherein a drain terminal of the second low-side FET is coupled to the cathode terminal of the second capacitor.

12. The multistage power converter of claim 9, wherein a capacitance of the first capacitor is substantially equal to a capacitance of the second capacitor.

13. A method for operating a multistage power converter, comprising:

turning on a first stage circuit of the multistage power converter during a first on-time to charge a first output inductor of the multistage power converter;

turning on a first crossing FET to couple a cathode terminal of a first capacitor to an anode terminal of a second capacitor during the first on-time to divide a voltage input of the multistage power converter, wherein the first capacitor is coupled between a first pair of field-effect transistors (FETs) of the first stage circuit;

turning on a second stage circuit of the multistage power converter during a second on-time to charge a second output inductor of the multistage power converter; and turning on a second crossing FET to couple a cathode terminal of the second capacitor to an anode terminal of the first capacitor during the second on-time to divide the voltage input, wherein the second capacitor is coupled between a second pair of FETs of the second stage circuit, wherein a drain terminal of the first crossing FET is directly coupled to the cathode terminal of the first capacitor, wherein a source terminal of the first crossing FET is directly coupled to the anode terminal of the second capacitor, wherein a drain terminal of the second crossing FET is directly coupled to the cathode terminal of the second capacitor, and wherein a source terminal of the second crossing FET is directly coupled to the anode terminal of the first capacitor.

14. The method of claim 13, further comprising:

turning on the first stage circuit before turning off the second stage circuit; and then turning on the second stage circuit and before turning off the first stage circuit.

15. The method of claim 13, further comprising:

operating the first stage circuit at a switching frequency, the first on-time, and a first phase; and operating the second stage circuit at the switching frequency, the second on-time, and a second phase different than the first phase.

* * * * *